United States Patent
Baba et al.

(10) Patent No.: US 11,015,651 B2
(45) Date of Patent: May 25, 2021

(54) BEARING DEVICE FOR VEHICLE WHEEL AND METHOD FOR MANUFACTURING SAID DEVICE

(71) Applicant: NTN CORPORATION, Osaka (JP)

(72) Inventors: Tomoko Baba, Iwata (JP); Chinami Kitanaka, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/081,203

(22) PCT Filed: Mar. 9, 2017

(86) PCT No.: PCT/JP2017/009591
§ 371 (c)(1),
(2) Date: Aug. 30, 2018

(87) PCT Pub. No.: WO2017/155063
PCT Pub. Date: Sep. 14, 2017

(65) Prior Publication Data
US 2019/0093703 A1 Mar. 28, 2019

(30) Foreign Application Priority Data
Mar. 10, 2016 (JP) .............................. JP2016-047668

(51) Int. Cl.
*F16C 33/64* (2006.01)
*F16C 19/18* (2006.01)
(Continued)

(52) U.S. Cl.
CPC .......... *F16C 33/64* (2013.01); *B60B 27/0005* (2013.01); *F16C 19/18* (2013.01);
(Continued)

(58) Field of Classification Search
CPC ...... F16C 33/64; F16C 19/183; F16C 19/184; F16C 19/185; F16C 2326/02;
(Continued)

(56) References Cited

U.S. PATENT DOCUMENTS 4,059,879 A * 11/1977 Chmura .................. B21H 1/12
 384/513
5,736,853 A * 4/1998 Rigaux ................... G01P 3/446
 324/173
(Continued)

FOREIGN PATENT DOCUMENTS

CN 101784397 7/2010
JP 09280255 A * 10/1997 ............. F16C 33/64
(Continued)

OTHER PUBLICATIONS

Machine Translation of JP-09280255-A (Year: 1997).*
(Continued)

*Primary Examiner* — Alan B Waits
(74) *Attorney, Agent, or Firm* — Wenderoth, Lind & Ponack, L.L.P.

(57) ABSTRACT

A bearing device for a vehicle wheel includes an outer member which is a plastic work piece in which an open hole in an outer-side end part is pushed out from inner sides, and an outer periphery of the outer member has a bulged part that is enlarged radially outward.

1 Claim, 10 Drawing Sheets

(51) Int. Cl.
 *B60B 27/00* (2006.01)
 *F16C 33/58* (2006.01)
 *F16C 19/50* (2006.01)
 *F16C 33/78* (2006.01)
(52) U.S. Cl.
 CPC .......... *F16C 19/184* (2013.01); *F16C 19/505* (2013.01); *F16C 33/58* (2013.01); *F16C 33/7876* (2013.01); *F16C 2326/02* (2013.01)
(58) Field of Classification Search
 CPC ....... F16C 2240/40–48; B60B 27/0005; Y10T 29/49689; Y10T 29/49684; B21K 1/04; B21K 1/40
 See application file for complete search history.

(56) References Cited

U.S. PATENT DOCUMENTS

| | | | | |
|---|---|---|---|---|
| 6,065,322 | A * | 5/2000 | Tabata | B21K 1/04 29/898.057 |
| 7,832,942 | B2 | 11/2010 | Komori et al. | |
| 8,516,705 | B2 | 8/2013 | Kobayashi et al. | |
| 2001/0019639 | A1 * | 9/2001 | Toda | B60B 27/0084 384/537 |
| 2006/0285786 | A1 * | 12/2006 | Shige | B60B 27/00 384/489 |
| 2009/0046969 | A1 * | 2/2009 | Hirai | B60B 27/0084 384/544 |
| 2009/0123102 | A1 * | 5/2009 | Kubo | B60B 7/0013 384/544 |
| 2009/0154864 | A1 | 6/2009 | Komori et al. | |
| 2009/0180726 | A1 * | 7/2009 | Siebeneick | B60B 3/02 384/512 |
| 2010/0002972 | A1 * | 1/2010 | Ohtsuki | B60B 27/0005 384/544 |
| 2010/0239202 | A1 * | 9/2010 | Kuroda | B60B 27/0084 384/512 |
| 2011/0099813 | A1 * | 5/2011 | Kobayashi | F16C 33/64 29/898.04 |
| 2012/0014632 | A1 * | 1/2012 | Nishikawa | G01L 5/0019 384/448 |
| 2013/0053155 | A1 * | 2/2013 | Watanabe | B60B 27/0031 464/157 |
| 2013/0066517 | A1 * | 3/2013 | Nishikawa | B60B 27/0005 701/34.4 |
| 2013/0200686 | A1 * | 8/2013 | Kawaguchi | B60B 35/128 301/126 |
| 2013/0229046 | A1 * | 9/2013 | Harada | B60B 27/065 301/110 |
| 2013/0249273 | A1 * | 9/2013 | Norimatsu | B60B 27/0068 301/109 |
| 2013/0278046 | A1 * | 10/2013 | Ciulla | B60B 27/0068 301/105.1 |
| 2014/0199013 | A1 * | 7/2014 | Buising | B60B 27/0005 384/504 |
| 2015/0010260 | A1 * | 1/2015 | Meeker | B60B 27/001 384/544 |
| 2015/0123455 | A1 * | 5/2015 | Olivieri | B60B 27/00 301/109 |
| 2016/0114624 | A1 * | 4/2016 | Morello | B60B 27/0005 384/480 |
| 2017/0219013 | A1 * | 8/2017 | Yokota | F16C 43/04 |
| 2018/0257430 | A1 * | 9/2018 | Yamamoto | B60B 27/0005 |

FOREIGN PATENT DOCUMENTS

| | | |
|---|---|---|
| JP | 2003-025803 | 1/2003 |
| JP | 2008-155837 | 7/2008 |
| WO | 2009/044809 | 4/2009 |

OTHER PUBLICATIONS

International Search Report dated Jun. 6, 2017 in International (PCT) Application No. PCT/JP2017/009591.
First Office Action dated Nov. 1, 2019 in Chinese Patent Application No. 201780015435.5, with English translation.

\* cited by examiner

[FIG.1]
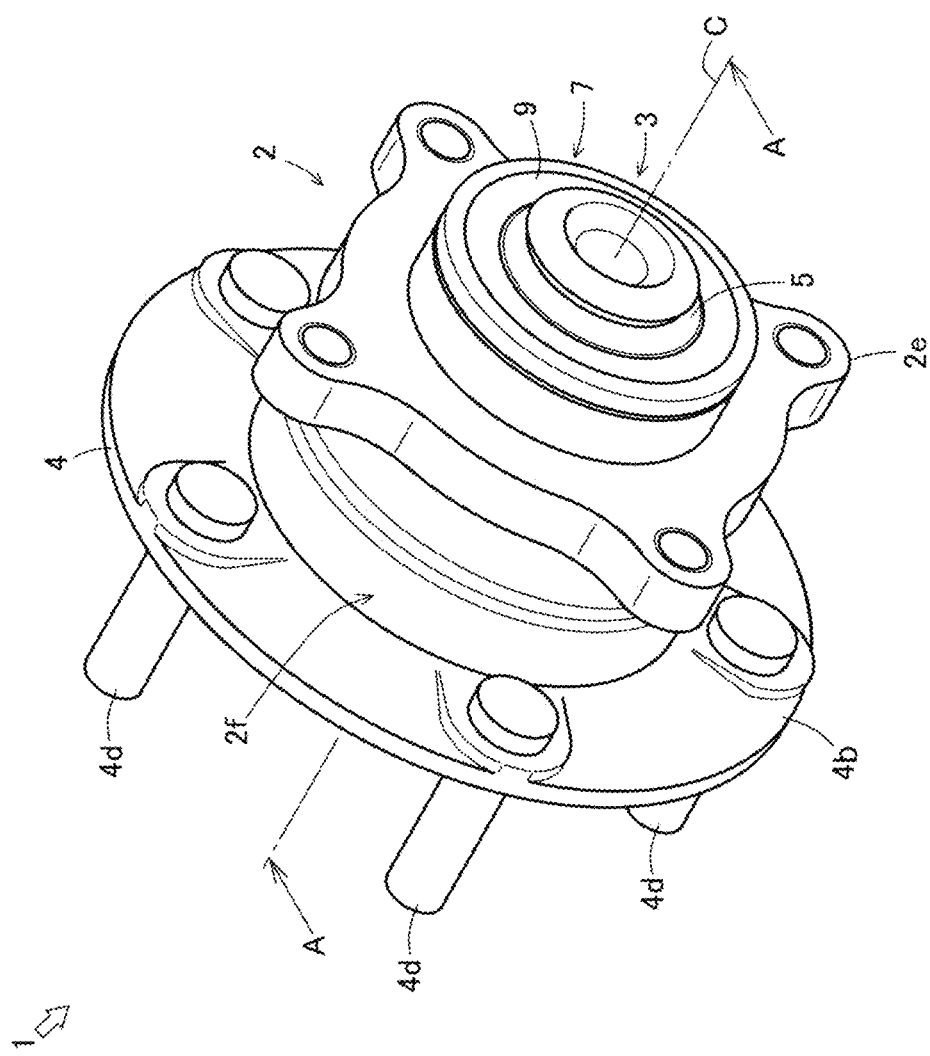

[FIG.2]
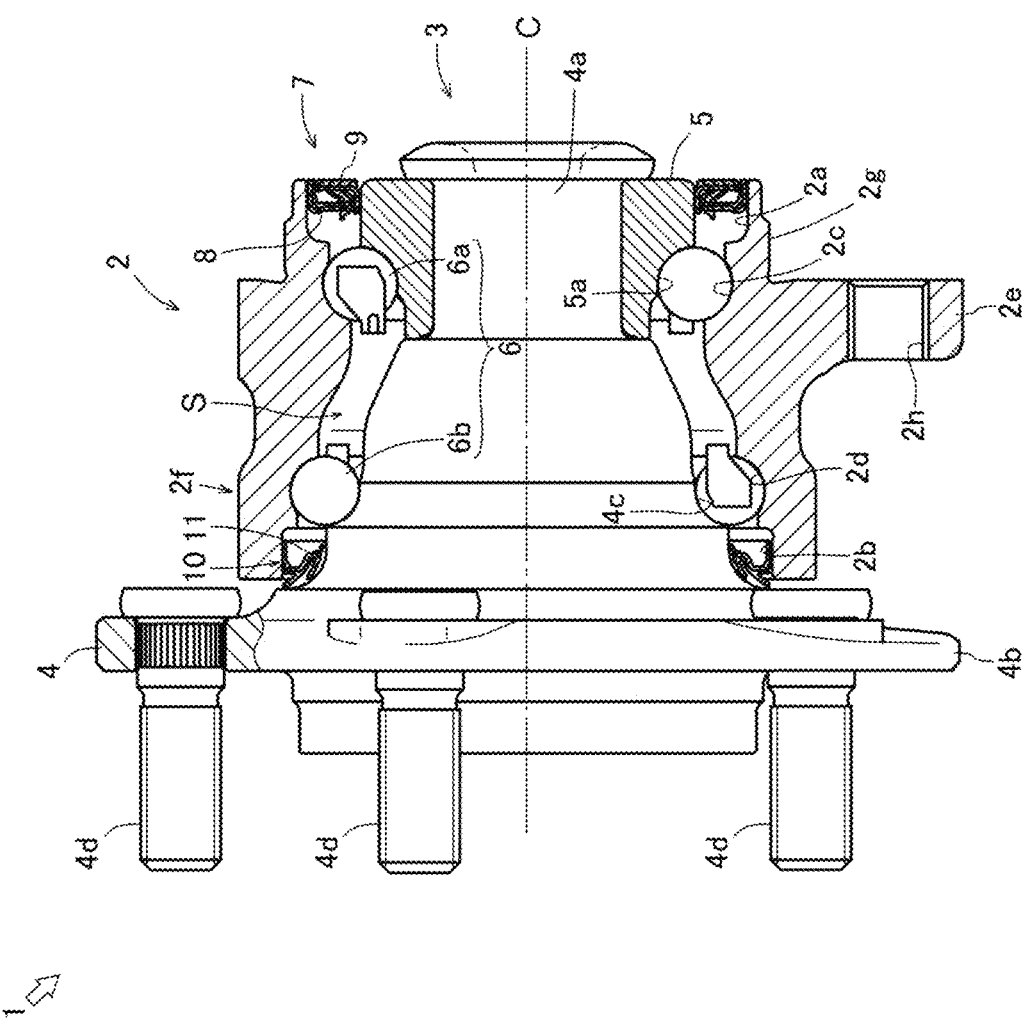

[FIG.3]
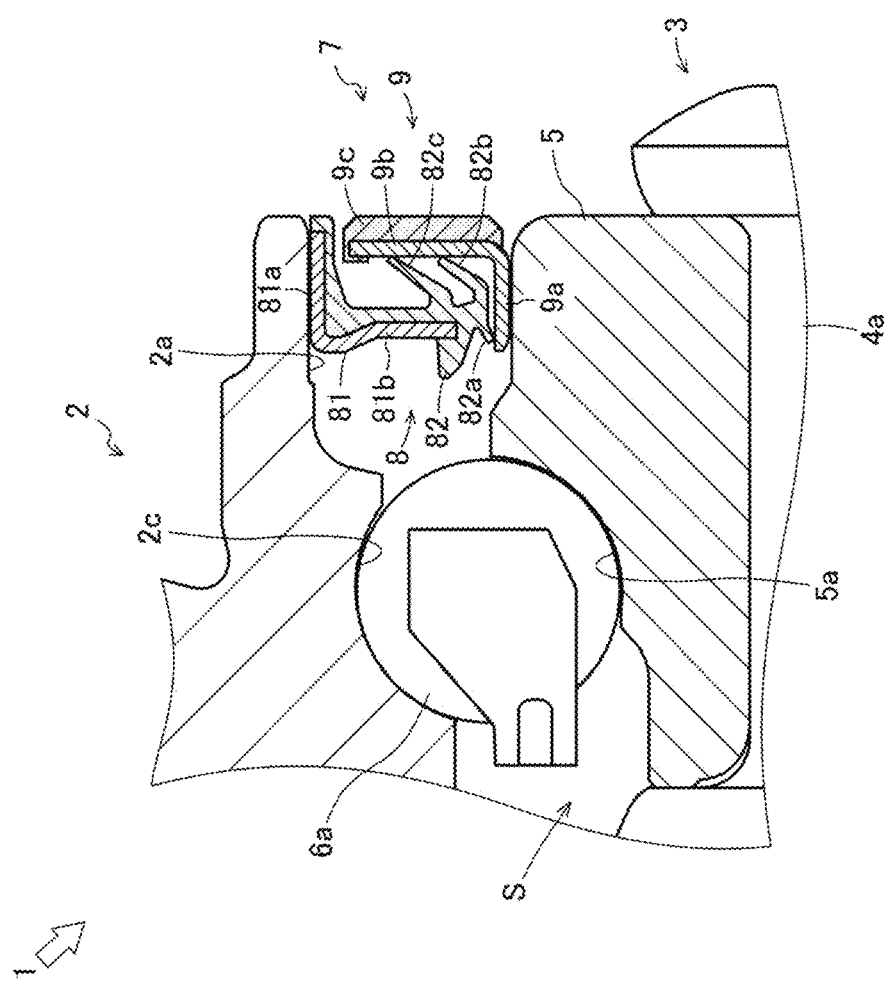

[FIG.4]
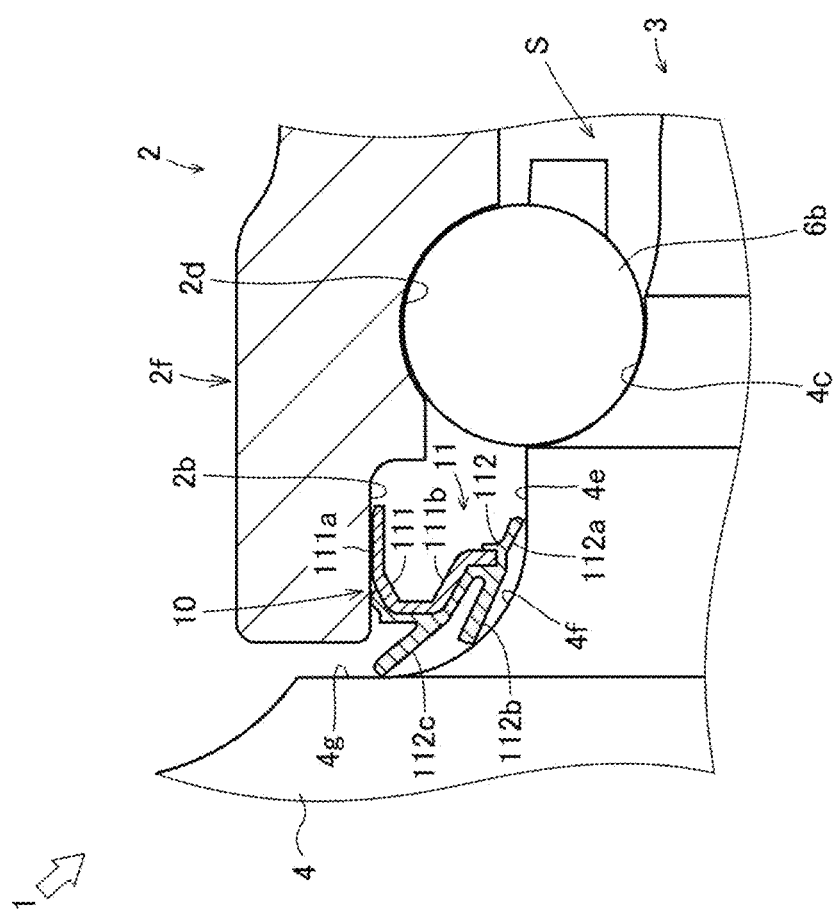

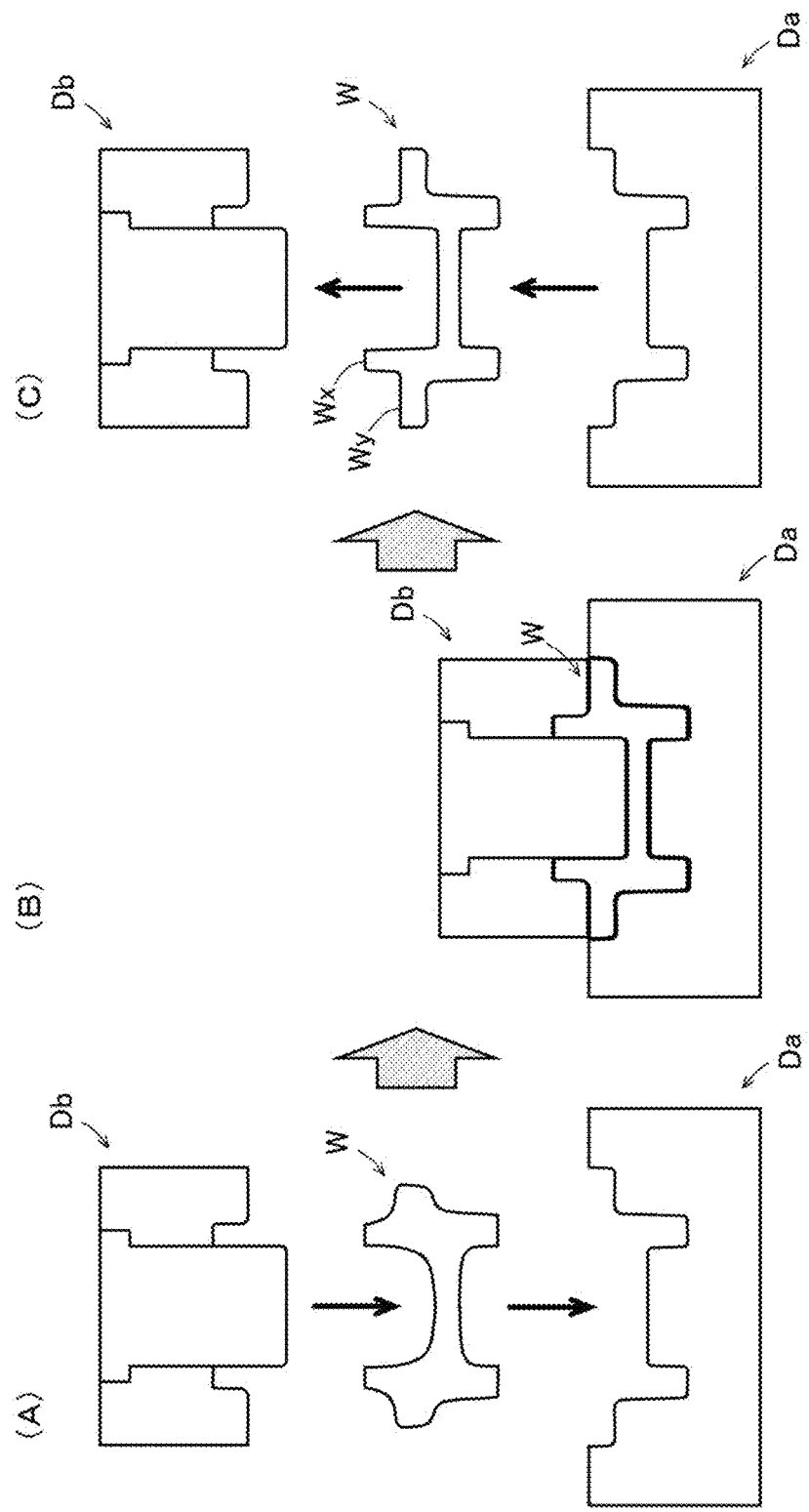
[FIG.5]

[FIG.6]
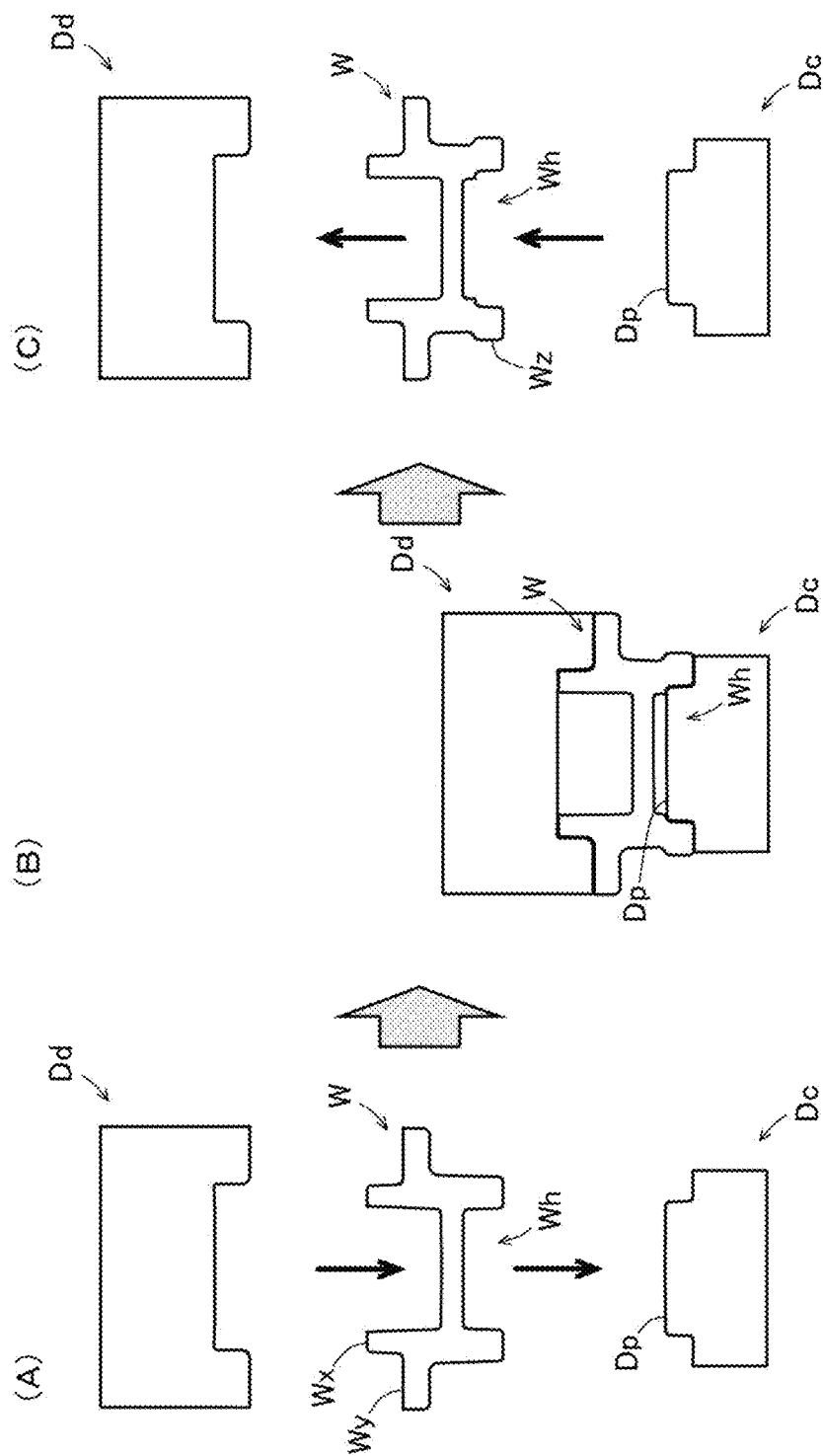

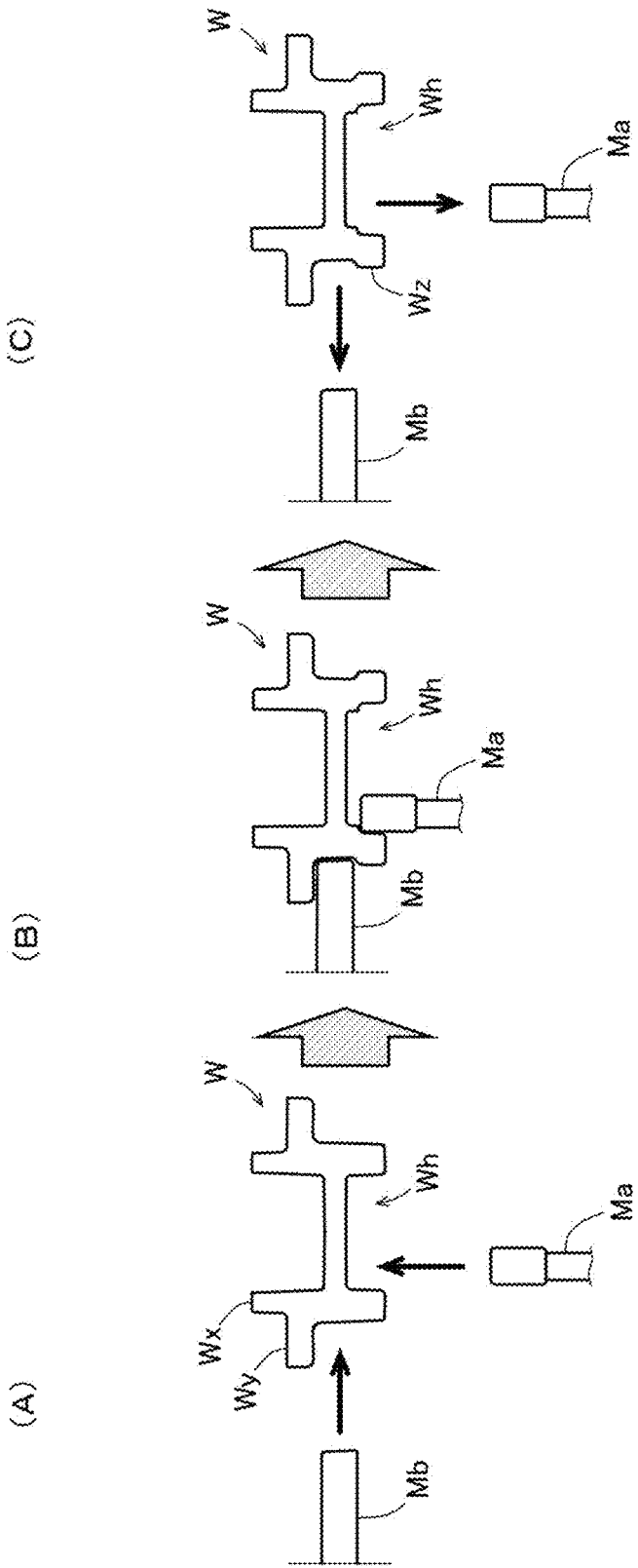

[FIG.8]
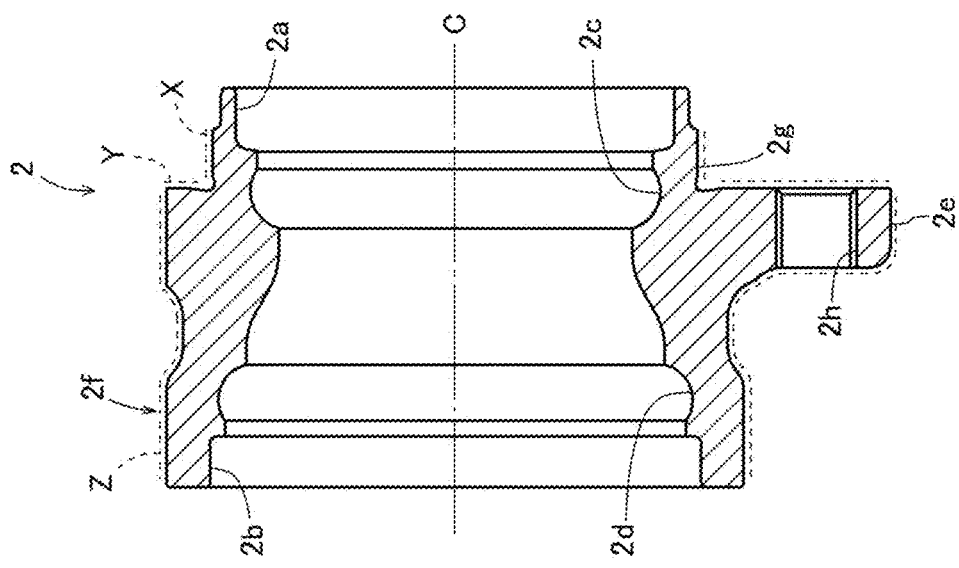

[FIG.9]
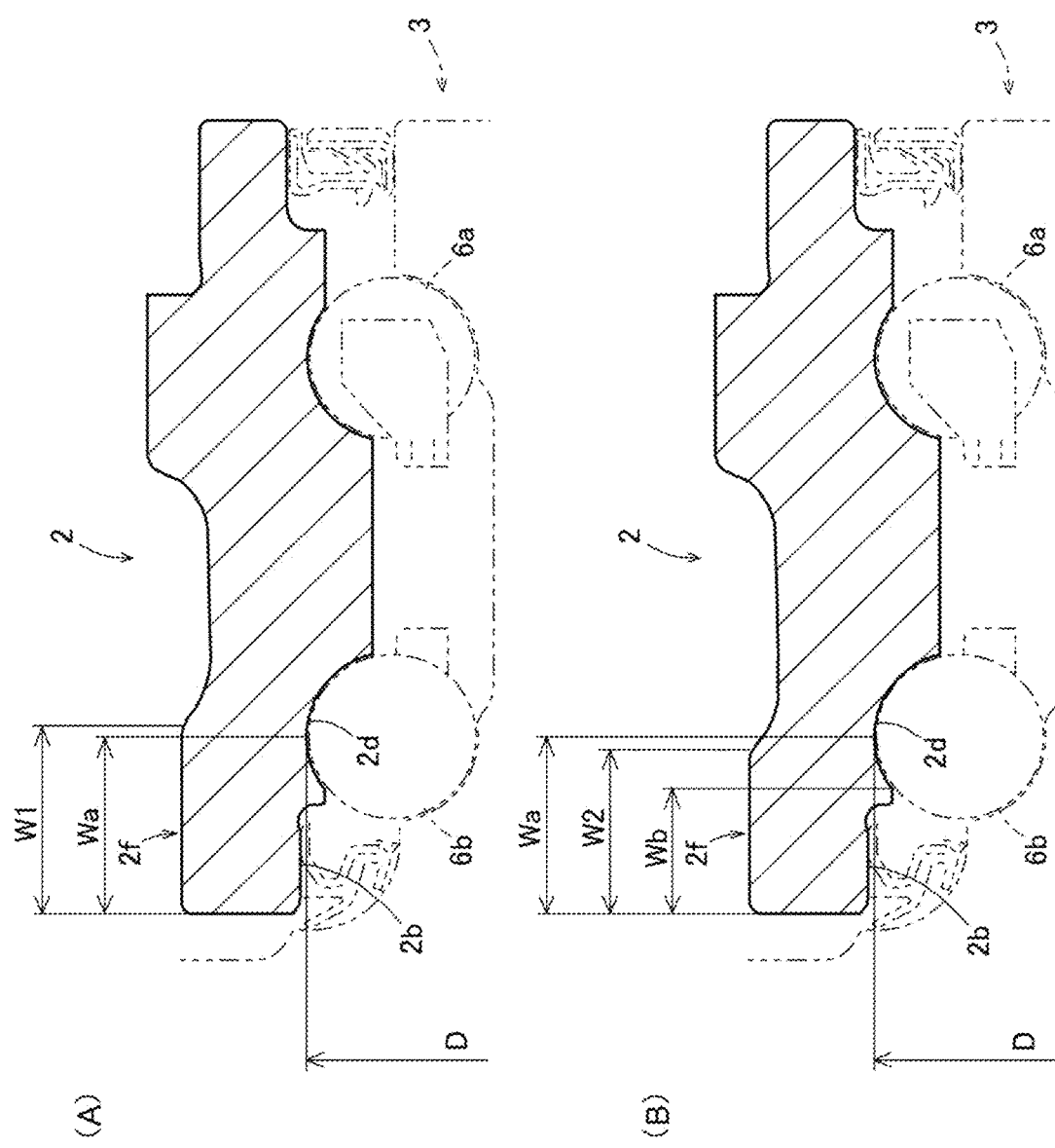

[FIG.10]
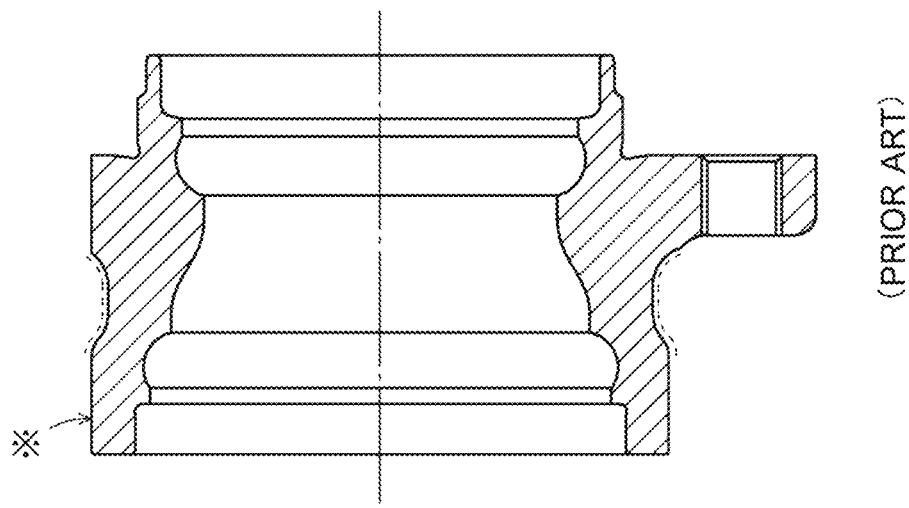

BEARING DEVICE FOR VEHICLE WHEEL AND METHOD FOR MANUFACTURING SAID DEVICE

TECHNICAL FIELD

The present invention relates to a bearing device for a vehicle wheel, and a method for manufacturing the bearing device. More specifically, the present invention relates to a bearing device for a vehicle wheel, the bearing device being capable of preventing a reduction in rolling contact fatigue life, and a method for manufacturing the bearing device.

BACKGROUND ART

A conventionally known bearing device for a vehicle wheel is configured to rotatably support a vehicle wheel, in a suspension of, for example, an automobile. The bearing device includes an outer member fixed to a knuckle of the suspension. The bearing device also includes double-row rolling elements disposed inside the outer member, and an inner member supported by the double-row rolling elements. The bearing device, which is fixed to a vehicle body, thus causes the vehicle wheel to be rotatable, the vehicle wheel being mounted to the inner member.

Such a bearing device for a vehicle wheel employs double-row angular ball bearings in terms of ensuring of rigidity and improvement of fuel efficiency. When a vehicle body turns around, increased radial and axial loads are applied to a counter vehicle wheel with respect to a turning direction (e.g., a left vehicle wheel when a vehicle body turns right). In this case, an outer member with lower rigidity becomes deformed. For this reason, the rigidity of an outer-side ball row is enhanced to prevent a reduction in rolling contact fatigue life. For example, JP A 2008-155837 discloses a bearing device for a vehicle wheel, the bearing device having such a configuration.

In the bearing device disclosed in JP A 2008-155837, the rigidity of an outer-side ball row is enhanced by making the outer-side ball row larger in pitch circle diameter than an inner-side ball row and increasing the number of balls in the outer-side ball row. In the bearing device, making the pitch circle diameter of the outer-side ball row larger causes an increase in size of an opening in an outer-side end of an outer member. In addition, the outer member has, on its outer-side end, a large-diameter cylindrical portion on which a seal member is fit, and a reference face for cutting. Therefore, if large load is applied to the bearing device, the outer-side end of the outer member becomes deformed in a substantially elliptical shape since the outer-side end of the outer member is thin. As a result, the rolling contact fatigue life is shortened in some cases due to degradation in circularity of an outer raceway surface being in contact with the outer-side ball row.

A bearing device for a vehicle wheel, which has been proposed in view of the circumstances described above, prevents a reduction in rolling contact fatigue life as follows. That is, in order to suppress degradation in circularity of an outer raceway surface being in contact with an outer-side ball row, an outer member has, on its outer-side end, a thick portion (see an asterisk in FIG. 10) for enhancing the rigidity of the outer-side end. However, the thick portion causes an increase in entire weight of the bearing device. In addition, a process of cutting an unnecessary part of the thick portion (i.e., a process of cutting the thick portion along a broken line in FIG. 10) for the purpose of reducing the entire weight as much as possible may cause reduction in production efficiency.

SUMMARY OF INVENTION

Technical Problem

The present invention has been made in view of the circumstances described above. One object of the present invention is to provide a bearing device for a vehicle wheel. The bearing device is capable of preventing a reduction in rolling contact fatigue life by enhancing the rigidity of an outer-side end of an outer member while reducing the entire weight of the bearing device as much as possible, to suppress degradation in circularity of an outer raceway surface being in contact with an outer-side ball row. Another object of the present invention is to provide a method for manufacturing the bearing device.

Solutions to Problems

The present invention provides a bearing device for a vehicle wheel. The bearing device includes an outer member, an inner member, and double-row rolling elements. The outer member has, on its inner circumference, double-row outer raceway surfaces integrally formed on the outer member. The inner member includes a wheel hub and at least one inner ring. The wheel hub has a vehicle wheel-mounting flange integrally formed thereon and has, on its outer circumference, a cylindrical portion extending axially. The at least one inner ring is press-fit on the cylindrical portion of the wheel hub. The inner member has, on its outer circumference, double-row inner raceway surfaces facing the double-row outer raceway surfaces. The double-row rolling elements are rollably disposed between the double-row outer raceway surfaces of the outer member and the double-row inner raceway surfaces of the inner member, respectively. The outer member is formed by plastic working that involves widening by press an opening in an outer-side end of the outer member from an inside of the outer member. The outer member has, on its outer circumference, a thick portion bulging radially outward.

According to the present invention, the outer member is formed by forging that involves widening by press the opening in the outer-side end of the outer member from the inside of the outer member.

According to the present invention, the outer member is formed by rolling that involves widening by press the opening in the outer-side end of the outer member from the inside of the outer member.

According to the present invention, the thick portion is formed in an annular shape about a rotation axis of the inner member, and the thick portion has a widthwise dimension larger than a dimension ranging from an outer-side end face of the outer member to a position corresponding to a maximum outer diameter of an outer one of the double-row outer raceway surfaces.

The present invention also provides a method for manufacturing a bearing device for a vehicle wheel. The bearing device includes an outer member, an inner member, and double-row rolling elements. The outer member has, on its inner circumference, double-row outer raceway surfaces integrally formed on the outer member. The inner member includes a wheel hub and at least one inner ring. The wheel hub has a vehicle wheel-mounting flange integrally formed thereon and has, on its outer circumference, a cylindrical portion extending axially. The at least one inner ring is press-fit on the cylindrical portion of the wheel hub. The inner member has, on its outer circumference, double-row inner raceway surfaces facing the double-row outer raceway surfaces. The double-row rolling elements are rollably disposed between the double-row outer raceway surfaces of the outer member and the double-row inner raceway surfaces of the inner member, respectively. The method includes widening by press an opening in an outer-side end of the outer member from an inside of the outer member by a forging method to form a thick portion on an outer circumference of the outer member, the thick portion bulging radially outward.

The present invention also provides a method for manufacturing a bearing device for a vehicle wheel. The bearing device includes an outer member, an inner member, and double-row rolling elements. The outer member has, on its inner circumference, double-row outer raceway surfaces integrally formed on the outer member. The inner member includes a wheel hub and at least one inner ring. The wheel hub has a vehicle wheel-mounting flange integrally formed thereon and has, on its outer circumference, a cylindrical portion extending axially. The at least one inner ring is press-fit on the cylindrical portion of the wheel hub. The inner member has, on its outer circumference, double-row inner raceway surfaces facing the double-row outer raceway surfaces. The double-row rolling elements are rollably disposed between the double-row outer raceway surfaces of the outer member and the double-row inner raceway surfaces of the inner member, respectively. The method includes widening by press an opening in an outer-side end of the outer member from an inside of the outer member by a rolling method to form a thick portion on an outer circumference of the outer member, the thick portion bulging radially outward.

Advantageous Effects of Invention

In the bearing device according to the present invention, the outer member is formed by plastic working that involves widening by press the opening in the outer-side end of the outer member from the inside of the outer member. In addition, the outer member has, on its outer circumference, the thick portion bulging radially outward. The present invention thus prevents a reduction in rolling contact fatigue life by enhancing the rigidity of the outer-side end of the outer member while reducing the entire weight of the bearing device as much as possible, to suppress degradation in circularity of the outer raceway surface being in contact with the outer-side ball row. The present invention also prevents reduction in production efficiency by virtue of elimination of a process of cutting an unnecessary part of the thick portion on the outer circumference of the outer member.

In the bearing device according to the present invention, the outer member is formed by forging that involves widening by press the opening in the outer-side end of the outer member from the inside of the outer member. The present invention thus simplifies processes of manufacturing the bearing device, and enhances the rigidity of the thick portion by work hardening.

In the bearing device according to the present invention, the outer member is formed by rolling that involves widening by press the opening in the outer-side end of the outer member from the inside of the outer member. The present invention thus simplifies processes of manufacturing the bearing device, and enhances the rigidity of the thick portion by work hardening.

In the bearing device according to the present invention, the thick portion is formed in an annular shape about the rotation axis of the inner member, and the thick portion has the widthwise dimension larger than the dimension ranging from the outer-side end face of the outer member to the position corresponding to the maximum outer diameter of the outer one of the double-row outer raceway surfaces. The present invention thus further enhances the rigidity to load to be applied to the outer one of the double-row outer raceway surfaces.

The method according to the present invention includes widening by press the opening in the outer-side end of the outer member from the inside of the outer member by the forging method to form the thick portion on the outer circumference of the outer member, the thick portion bulging radially outward. The present invention enables the thick portion to be formed on only the outer-side end of the outer member and thus reduces the entire weight of the bearing device as much as possible. The present invention also prevents reduction in production efficiency by virtue of elimination of a process of cutting an unnecessary part of the thick portion on the outer circumference of the outer member.

The method according to the present invention includes widening by press the opening in the outer-side end of the outer member from the inside of the outer member by the rolling method to form the thick portion on the outer circumference of the outer member, the thick portion bulging radially outward. The present invention enables the thick portion to be formed on only the outer-side end of the outer member and thus reduces the entire weight of the bearing device as much as possible. The present invention also prevents reduction in production efficiency by virtue of elimination of a process of cutting an unnecessary part of the thick portion on the outer circumference of the outer member.

BRIEF DESCRIPTION OF DRAWINGS

FIG. 1 is a perspective view of an overall configuration of a bearing device for a vehicle wheel.

FIG. 2 is a section view of the overall configuration of the bearing device.

FIG. 3 is an enlarged section view of a partial structure of the bearing device.

FIG. 4 is an enlarged section view of a partial structure of the bearing device.

FIG. 5 is a conceptual view of a procedure for forming a general shape of an outer member.

FIG. 6 is a conceptual view of a procedure for forming a thick portion by a forging method.

FIG. 7 is a conceptual view of a procedure for forming a thick portion by a rolling method.

FIG. 8 is a section view of the outer member.

FIGS. 9(A) and 9(B) are enlarged section views of a main part of the outer member.

FIG. 10 is a section view of a conventional outer member.

DESCRIPTION OF EMBODIMENTS

With reference to FIGS. 1 to 4, a description will be given of a bearing device 1 for a vehicle wheel according to the present invention. FIG. 2 is a section view taken along a line A-A in FIG. 1. FIGS. 3 and 4 are enlarged views of a partial region in FIG. 2.

The bearing device 1 is configured to rotatably support a vehicle wheel, in a suspension of, for example, an automobile. The bearing device 1 includes an outer member 2, an inner member 3 (including a wheel hub 4 and an inner ring 5), rolling elements 6, a seal member 7 (hereinafter, referred to as a "first-side seal member 7"), and a seal member 10 (hereinafter, referred to as a "second-side seal member 10"). In the following description, the term "first side" represents the vehicle body side (i.e., inner side) of the bearing device 1. On the other hand, the term "second side" represents the vehicle wheel side (i.e., outer side) of the bearing device 1.

The outer member 2 is configured to support the inner member 3 (including the wheel hub 4 and the inner ring 5). The outer member 2 is formed in a substantially cylindrical shape. The outer member 2 is made of medium- or high-carbon steel containing 0.40 to 0.80 wt % carbon, such as S53C. The outer member 2 has, on its first-side end, a large-diameter cylindrical portion 2a. The outer member 2 also has, on its second-side end, a large-diameter cylindrical portion 2b. The outer member 2 also has, on its inner circumference, an outer raceway surface 2c and an outer raceway surface 2d each formed in an annular shape. The outer raceway surfaces 2c and 2d are parallel to each other. The outer raceway surfaces 2c and 2d are hardened by induction hardening with a surface hardness in a range from 58 to 64 HRC. The outer member 2 also has, on its outer circumference, a knuckle-mounting flange 2e to be mounted to a knuckle of the suspension. The knuckle-mounting flange 2e is integrally formed on the outer member 2.

The inner member 3 is configured to rotatably support the vehicle wheel (not illustrated). The inner member 3 includes the wheel hub 4 and the inner ring 5.

The wheel hub 4 is formed in a one-end closed cylindrical shape. The wheel hub 4 is made of medium- or high-carbon steel containing 0.40 to 0.80 wt % carbon, such as S53C. The wheel hub 4 has, on its first-side end, a cylindrical portion 4a. The inner ring 5 is press-fit on the cylindrical portion 4a. The wheel hub 4 also has, on its second-side end, a vehicle wheel-mounting flange 4b. The vehicle wheel-mounting flange 4b is integrally formed on the wheel hub 4. The vehicle wheel-mounting flange 4b has through bores concentrically formed about a rotation axis C of the inner member 3 at equal intervals. Hub bolts 4d are respectively inserted into the through bores. The wheel hub 4 also has, on its outer circumference, an inner raceway surface 4c formed in an annular shape. The wheel hub 4 is hardened, in its region ranging from the cylindrical portion 4a to a seal land portion (that is defined with a shaft face 4e, a curved face 4f, and a side face 4g to be described later) via the inner raceway surface 4c, by induction hardening with a surface hardness in a range from 58 to 64 HRC. The wheel hub 4 thus has sufficient mechanical strength and durability to rotary bending load to be applied to the vehicle wheel-mounting flange 4b. The inner raceway surface 4c faces the outer raceway surface 2d of the outer member 2.

The inner ring 5 is formed in a substantially cylindrical shape. The inner ring 5 is made of high-carbon chromium bearing steel such as SUJ2. The inner ring 5 has, on its outer circumference, an inner raceway surface 5a formed in an annular shape. The inner ring 5 is press-fit on the cylindrical portion 4a of the wheel hub 4. The inner raceway surface 5a is thus formed on an outer circumference of the cylindrical portion 4a. The inner ring 5 is hardened in a range from 58 to 64 HRC to its core by quenching, with coolant. The inner ring 5 thus has sufficient mechanical strength and durability to rotary bending load to be applied to the vehicle wheel-mounting flange 4b. The inner raceway surface 5a faces the outer raceway surface 2c of the outer member 2.

The rolling elements 6 are interposed between the outer member 2 and the inner member 3 (including the wheel hub 4 and the inner ring 5). The rolling elements 6 include an inner-side ball row (hereinafter, referred to as a "first-side ball row 6a") and an outer-side ball row (hereinafter, referred to as a "second-side ball row 6b"). Each of the first-side ball row 6a and the second-side ball row 6b is made of high-carbon chromium bearing steel such as SUJ2. Each of the first-side ball row 6a and the second-side ball row 6b is hardened in a range from 58 to 64 HRC to its core by quenching, with coolant. The first-side ball row 6a includes a plurality of balls and a cage in which the balls are retained annularly. The first-side ball row 6a is rollably accommodated between the inner raceway surface 5a of the inner ring 5 and the outer raceway surface 2c of the outer member 2. The outer raceway surface 2c of the outer member 2 faces the inner raceway surface 5a of the inner ring 5. The second-side ball row 6b includes a plurality of balls and a cage in which the balls are retained annularly. The second-side ball row 6b is rollably accommodated between the inner raceway surface 4c of the wheel hub 4 and the outer raceway surface 2d of the outer member 2. The outer raceway surface 2d of the outer member 2 faces the inner raceway surface 4c of the wheel hub 4. In the first-side ball row 6a and the second-side ball row 6b, the outer member 2 and the inner member 3 (including the wheel hub 4 and the inner ring 5) form double-row angular ball bearings. The bearing device 1 includes, but not limited to, the double-row angular ball bearings. The bearing device 1 may include, for example, double-row tapered roll bearings. The bearing device 1 employs, but not limited to, a third-generation structure in that the inner raceway surface 4c for the second-side ball row 6b is directly formed on the outer circumference of the wheel hub 4. The bearing device 1 may employ a second-generation structure in that a pair of inner rings 5 is press-fixed on the wheel hub 4. Alternatively, the bearing device 1 may employ a first-generation structure in that the bearing device 1 includes an outer ring serving as the outer member 2 and the inner ring 5 serving as an inner member, without including the wheel hub 4.

The first-side seal member 7 is mounted to an inner-side end of an annular space S. The annular space S is formed between the outer member 2 and the inner member 3. The first-side seal member 7 includes a seal ring 8 formed in an annular shape, and a slinger 9 formed in an annular shape.

The seal ring 8 is fit on the large-diameter cylindrical portion 2a of the outer member 2. The seal ring 8 is thus integrated with the outer member 2. The seal ring 8 includes a metal core 81 and a seal rubber 82 as an elastic member.

The metal core 81 is formed from a ferritic stainless steel sheet (e.g., JIS SUS 430), an austenitic stainless steel sheet (e.g., JIS SUS 304), or a preserved cold rolled steel sheet (e.g., JIS SPCC). The metal core 81 is press-formed from an annular steel sheet bent to have a substantially L-shaped axial section. The metal core 81 includes a fitting portion 81a formed in a cylindrical shape, and a side plate 81b formed in a disk shape. The side plate 81b extends from one end of the fitting portion 81a toward the inner member 3 (i.e., the inner ring 5). The fitting portion 81a and the side plate 81b cross substantially perpendicularly to each other. The fitting portion 81a faces a fitting portion 9a (to be described later) of the slinger 9. On the other hand, the side plate 81b faces a side plate 9b (to be described later) of the slinger 9. The seal rubber 82 as an elastic member is adhered to the fitting portion 81a and the side plate 81b, via vulcanized adhesive.

The seal rubber 82 is made of synthetic rubber. Examples of the synthetic rubber may include NBR (acrylonitrile-butadiene rubber), HNBR (hydrogenation acrylonitric-butadiene rubber) superior in heat resistance, EPDM (ethylene propylene rubber), ACM (poly-acrylic rubber) superior in heat resistance and chemical resistance, FKM (fluororubber), and silicone rubber. The seal rubber 82 includes a radial lip 82a, an inner axial lip 82b, and an outer axial lip 82c as seal lips.

The slinger 9 is fit on an outer circumference of the inner member 3 (i.e., the outer circumference of the inner ring 5). The slinger 9 is thus integrated with the inner member 3.

The slinger 9 is formed from a ferritic stainless steel sheet (e.g., JIS SUS 430), an austenitic stainless steel sheet (e.g., JIS SUS 304), or a preserved cold rolled steel sheet (e.g., JIS SPCC). The slinger 9 is press-formed from an annular steel sheet bent to have a substantially L-shaped axial section. The slinger 9 includes the fitting portion 9a formed in a cylindrical shape, and the side plate 9b formed in a disk shape. The side plate 9b extends from an end of the fitting portion 9a toward the outer member 2. The fitting portion 9a and the side plate 9b cross perpendicularly to each other. The fitting portion 9a faces the fitting portion 81a (described above) of the seal ring 8. On the other hand, the side plate 9b faces the side plate 81b (described above) of the seal ring 8. The side plate 9b is provided with a magnetic encoder 9c.

In the first-side seal member 7, the seal ring 8 faces the slinger 9. The radial lip 82a is in contact with the fitting portion 9a of the slinger 9 via an oil film. The inner axial lip 82b is in contact with the side plate 9b of the slinger 9 via the oil film. The outer axial lip 82c is also in contact with the side plate 9b of the slinger 9 via the oil film. As described above, the first-side seal member 7 enables a so-called pack seal to prevent intrusion of, for example, dust and leakage of grease.

The second-side seal member 10 is mounted on an outer-side end of the annular space S between the outer member 2 and the inner member 3. The second-side seal member 10 includes a seal ring 11 formed in an annular shape.

The second-side seal member 10 is fit on the large-diameter cylindrical portion 2b of the outer member 2. The second-side seal member 10 is thus integrated with the outer member 2. The seal ring 11 includes a metal core 111 and a seal rubber 112 as an elastic member.

The metal core 111 is formed from a ferritic stainless steel sheet (e.g., JIS SUS 430), an austenitic stainless steel sheet (e.g., JIS SUS 304), or a preserved cold rolled steel sheet (e.g., JIS SPCC). The metal core 111 is press-formed from an annular steel sheet bent to have a substantially C-shape as seen in axial section view. The metal core 111 includes a fitting portion 111a formed in a cylindrical shape, and a side plate 111b formed in a disk shape. The side plate 111b extends from one end of the fitting portion 111a toward the inner member 3 (i.e., the wheel hub 4). The fitting portion 111a and the side plate 111b cross each other while being curved. The fitting portion 111a faces the shaft face 4e of the wheel hub 4. The side plate 111b faces the curved face 4f and side face 4g of the wheel hub 4 (i.e., an end face of the vehicle wheel-mounting flange 4b). The seal rubber 112 as an elastic member is adhered to the side plate 111b, via vulcanized adhesive.

The seal rubber 112 is made of synthetic rubber. Examples of the synthetic rubber may include NBR (acrylonitrile-butadiene rubber), HNBR (hydrogenation acrylonitric-butadiene rubber) superior in heat resistance, EPDM (ethylene propylene rubber), ACM (poly-acrylic rubber) superior in heat resistance and chemical resistance, FKM (fluororubber), and silicone rubber. The seal rubber 112 includes a radial lip 112a, an inner axial lip 112b, and an outer axial lip 112c as seal lips.

The seal ring 11 of the second-side seal member 10 faces the wheel hub 4. The radial lip 112a is in contact with the shaft face 4e of the wheel hub 4 via an oil film. The inner axial lip 112b is in contact with the curved face 4f of the wheel hub 4 via the oil film. The outer axial lip 112c is also in contact with the side face 4g of the wheel hub 4 via the oil film. The second-side seal member 10 thus prevents intrusion of, for example, dust and leakage of grease.

With reference to FIGS. 5 and 6, next, a specific description will be given of a procedure for manufacturing the outer member 2.

As illustrated in FIGS. 1 and 2, the outer member 2 of the bearing device 1 is formed in a substantially cylindrical shape about the rotation axis C of the inner member 3. As illustrated in FIGS. 1 and 2, the outer member 2 has, on its relatively inner side, the knuckle-mounting flange 2e protruding radially outward. The outer member 2 has, on its outer-side end, a thick portion 2f bulging radially outward. The knuckle-mounting flange 2e and the thick portion 2f are formed on the entire circumference of the outer member 2 about the rotation axis C.

First, a description will be given of a procedure for forming a general shape of the outer member 2. FIG. 5 illustrates a flow of processes (A) to (C).

A fixed die Da for use in this procedure has a cavity into which an outer-side contour of the outer member 2 is transferred. More specifically, the fixed die Da has a cavity in which irregularities are formed in accordance with a contour of the outer member 2 nearer to the outer side than the knuckle-mounting flange 2e. A movable die Db for use in this procedure has a cavity into which an inner-side contour of the outer member 2 is transferred. More specifically, the movable die Db has a cavity in which irregularities are formed in accordance with a contour of the outer member 2 nearer to the inner side than the knuckle-mounting flange 2e. Therefore, a workpiece W (i.e., a material for the outer member 2 roughly formed) that is placed between the fixed die Da and the movable die Db is pressed against each of the dies (i.e., the fixed die Da and the movable die Db) and is formed in a predetermined shape. In this embodiment, the fixed die Da corresponds to a forging die having a cavity into which the outer-side contour of the outer member 2 is transferred. On the other hand, the movable die Db corresponds to a forging die having a cavity into which the inner-side contour of the outer member 2 is transferred. However, this embodiment is not limited thereto. For example, the movable die may be a forging die having a cavity into which the outer-side contour of the outer member 2 is transferred, whereas the fixed die may be a forging die having a cavity into which the inner-side contour of the outer member 2 is transferred.

The workpiece W is formed to have a cylindrical portion Wx and a flat plate portion Wy through the procedure. As illustrated in FIGS. 2 and 8, the cylindrical portion Wx is formed to have, on its inner circumference, the large-diameter cylindrical portion 2a and the outer raceway surface 2c through a cutting process to be carried out later. As illustrated in FIGS. 2 and 8, in the cylindrical portion Wx, an outer circumference on an inner-side end is cut into a precise cylindrical shape (i.e., a region shown with a broken line X in FIG. 8 is cut). The cylindrical portion Wx is thus formed to have a pilot portion 2g to be fit to a knuckle mounting bore. As illustrated in FIGS. 2 and 8, the flat plate portion Wy is formed to have a bolt bore 2h through a punching process to be carried out later. As illustrated in FIGS. 2 and 8, in the flat plate portion Wy, an inner-side end face is cut into a precise flat face shape (i.e., a region shown with a broken line Y in FIG. 8 is cut). The flat plate portion Wy is thus formed to have the knuckle-mounting flange 2e being in contact with a side face of the knuckle.

Next, a description will be given of a procedure for forming the thick portion 2f. FIG. 6 illustrates a flow of processes (A) to (C).

A fixed die Dc for use in this procedure has a projection Dp for widening an opening Wh in an outer-side end of the cylindrical portion Wx. More specifically, the projection Dp of the fixed die Dc is larger in diameter than the opening Wh in the outer-side end of the cylindrical portion Wx. A movable die Dd for use in this procedure has a recess to which the inner-side end of the cylindrical portion Wx is fit. In addition, the recess abuts against an end face of the inner-side end of the cylindrical portion Wx. More specifically, the recess in the movable die Dd is larger in diameter than the inner-side end of the cylindrical portion Wx. Moreover, the recess in the movable die Dd has such a depth as to abut against the end face of the inner-side end of the cylindrical portion Wx. The opening Wh in the outer-side end of the workpiece W (i.e., the material for the outer member 2 subjected to the procedure illustrated in FIG. 5) is thus widened by the projection Dp on the fixed die Dc and is formed in a predetermined shape. In this embodiment, the fixed die Dc corresponds to a forging die having the projection Dp for widening the opening Wh. On the other hand, the movable die Dd corresponds to a forging die having the recess to which the inner-side end of the cylindrical portion Wx is fit and which abuts against the end face of the inner-side end of the cylindrical portion Wx. However, this embodiment is not limited thereto. For example, the movable die may be a forging die having the projection Dp for widening the opening Wh, whereas the fixed die may be a forging die having the recess to which the inner-side end of the cylindrical portion Wx is fit and which abuts against the end face of the inner-side end of the cylindrical portion Wx.

The workpiece W is thus formed to have a protrusion Wz through the procedure described above. As illustrated in FIGS. 2 and 8, the large-diameter cylindrical portion 2b and the outer raceway surface 2d are formed on an inner circumference of the protrusion Wz through a cutting process to be carried out later. However, an outer circumference of the protrusion Wz (i.e., a region shown with a broken line Z in FIG. 8) is not subjected to the cutting process. As illustrated in FIGS. 2 and 8, the thick portion 2f is thus formed to cover the large-diameter cylindrical portion 2b and the outer raceway surface 2d.

In the bearing device 1 according to the present invention, as described above, the outer member 2 (specifically, the workpiece W as the material for the outer member 2) is formed by plastic working that involves widening by press the opening in the outer-side end of the outer member 2 (specifically, the opening Wh in the workpiece W) from the inside of the outer member 2. In addition, the outer member 2 has, on its outer circumference, the thick portion 2f bulging radially outward. The present invention thus prevents a reduction in rolling contact fatigue life by enhancing the rigidity of the outer-side end of the outer member 2 while reducing the entire weight of the bearing device 1 as much as possible, to suppress degradation in circularity of the outer raceway surface 2d being in contact with the second-side ball row 6b. The present invention also prevents reduction in production efficiency by virtue of elimination of a process of cutting an unnecessary part of the thick portion 2f on the outer circumference of the outer member 2.

In the bearing device 1 according to the present invention, the outer member 2 is formed by forging that involves widening by press the opening in the outer-side end of the outer member 2 (specifically, the opening Wh in the workpiece W) from the inside of the outer member 2. The present invention thus simplifies processes of manufacturing the bearing device 1, and enhances the rigidity of the thick portion 2f by work hardening. The work hardening is also referred to as strain hardening that means a phenomenon in which a deformation resistance increases due to increase in dislocation and multiple stratification.

Next, a description will be given of another procedure for forming the thick portion 2f. FIG. 7 illustrates a flow of processes (A) to (C).

A mandrel Ma for use in this procedure is inserted into the opening Wh in the outer-side end of the cylindrical portion Wx. In addition, the mandrel Ma is supported on the opening Wh in the outer-side end of the cylindrical portion Wx in contact with an inner circumference of the opening Wh. A die Mb for use in this procedure rotates in contact with an outer circumference of the cylindrical portion Wx to rotate the workpiece W. In addition, the die Mb moves in contact with the outer circumference of the cylindrical portion Wx to press the workpiece W against the mandrel Ma. The opening Wh in the outer-side end of the workpiece W is therefore widened by the mandrel Ma and is formed in a predetermined shape.

In the bearing device 1 according to the present invention, as described above, the outer member 2 may be formed by forging that involves widening by press the opening in the outer-side end of the outer member 2 (specifically, the opening Wh in the workpiece W) from the inside of the outer member 2. The present invention thus simplifies processes of manufacturing the bearing device 1, and enhances the rigidity of the thick portion 2f by work hardening.

With reference to FIGS. 9(A) and 9(B), next, a description will be given of a structure applicable to the bearing device 1. FIGS. 9(A) and 9(B) are enlarged section views of a main part of the outer member 2.

As illustrated in FIG. 9(A), the thick portion 2f is formed in the range from the outer-side end face of the outer member 2 to the outer circumference of the outer raceway surface 2d. The thick portion 2f has a widthwise dimension W1 larger than a dimension Wa ranging from the outer-side end face of the outer member 2 to a position corresponding to a maximum outer diameter D of the outer raceway surface 2d (W1>Wa). In other words, the thick portion 2f is formed to cover a region ranging from the outer-side end face of the outer member 2 to the position corresponding to the maximum outer diameter D of the outer raceway surface 2d.

In the bearing device 1 according to the present invention, as described above, the thick portion 2f is formed in the annular shape about the rotation axis C of the inner member 3, and the thick portion 2f has the widthwise dimension W1 larger than the dimension Wa ranging from the outer-side end face of the outer member 2 to the position corresponding to the maximum outer diameter D of the outer-side outer raceway surface 2d. The present invention thus further enhances the rigidity to load to be applied to the outer-side outer raceway surface 2d.

As illustrated in FIG. 9(B), the thick portion 2f may be formed in the range from the outer-side end face of the outer member 2 to the outer circumference of the outer raceway surface 2d. The thick portion 2f may have a widthwise dimension W2 that is larger than a dimension Wb ranging from the outer-side end face of the outer member 2 to an outer-side edge of the outer raceway surface 2d and is smaller than the dimension Wa ranging from the outer-side end face of the outer member 2 to the position corresponding to the maximum outer diameter D of the outer raceway surface 2d (Wa>W2>Wb). In other words, the thick portion 2f may be formed to partially cover the region ranging from the outer-side end face of the outer member 2 to the outer circumference of the outer raceway surface 2d.

The design described above further enhances the rigidity to load to be applied to the outer-side outer raceway surface 2d.

Next, the features of the method for manufacturing the bearing device 1 are mentioned.

As described above, one of the features of the method for manufacturing the bearing device 1 is a method of forming the thick portion 2f of the outer member 2.

More specifically, the method for manufacturing the bearing device 1 includes widening by press the opening in the outer-side end of the outer member 2 (specifically, the opening Wh in the workpiece W as the material for the outer member 2) from the inside of the outer member 2 by the forging method to form the thick portion 2f on the outer circumference of the outer member 2, the thick portion 2f bulging radially outward. The present invention enables the thick portion 2f to be formed on only the outer-side end of the outer member 2 and thus reduces the entire weight of the bearing device 1 as much as possible. The present invention also prevents reduction in production efficiency by virtue of elimination of a process of cutting an unnecessary part of the thick portion 2f on the outer circumference of the outer member 2.

Alternatively, the method for manufacturing the bearing device 1 includes widening by press the opening in the outer-side end of the outer member 2 (specifically, the opening Wh in the workpiece W as the material for the outer member 2) from the inside of the outer member 2 by the rolling method to form the thick portion 2f on the outer circumference of the outer member 2, the thick portion 2f bulging radially outward. The present invention enables the thick portion 2f to be formed on only the outer-side end of the outer member 2 and thus reduces the entire weight of the bearing device 1 as much as possible. The present invention also prevents reduction in production efficiency by virtue of elimination of a process of cutting an unnecessary part of the thick portion 2f on the outer circumference of the outer member 2.

The present invention is applicable to a bearing device for a vehicle wheel.

REFERENCE SIGNS LIST 1 bearing device for vehicle wheel
2 outer member
2c outer raceway surface
2d outer raceway surface
2f thick portion
3 inner member
4 wheel hub
4a cylindrical portion
4b vehicle wheel-mounting flange
4c inner raceway surface
5 inner ring
5a inner raceway surface
6 rolling element
7 seal member
8 seal ring
9 slinger
10 seal member
11 seal ring
C rotation axis
Dc fixed die
Dp projection
Dd fixed die
W workpiece
Wh opening
Wx cylindrical portion
Wy flat plate portion
Wz protrusion
W1 widthwise dimension
W2 widthwise dimension

The invention claimed is:

1. A method for manufacturing a bearing device for a vehicle wheel,
the bearing device including:
an outer member having, on an inner circumference thereof, double-row outer raceway surfaces integrally formed on the outer member, the outer member further having a knuckle-mounting flange;
an inner member including:
a wheel hub having a vehicle wheel-mounting flange integrally formed thereon, and having, on an outer circumference thereof, a cylindrical portion extending axially and
at least one inner ring press-fit on the cylindrical portion of the wheel hub;
the inner member having, on an outer circumference thereof, double-row inner raceway surfaces facing the double-row outer raceway surfaces; and
double-row rolling elements rollably disposed between the double-row outer raceway surfaces of the outer member and the double-row inner raceway surfaces of the inner member, respectively,
the method comprising:
widening an opening by pressing in an outer-side end of the outer member from an inside of the outer member by a forging method to form a bulged portion on an entire outer circumference of the outer member, wherein the bulged portion bulges radially outward, and wherein the outer member is pressed between a first die located axially opposite the outer-side end and a second die located axially on the outer-side end to form the bulged portion whereby the first die presses a first side of the knuckle-mounting flange extending in a radial direction and a second side of the knuckle-mounting flange extending in the radial direction axially opposite to the first side of the knuckle-mounting flange is not contacted during pressing.

* * * * *